United States Patent [19]
LoCascio et al.

[11] Patent Number: 5,990,725
[45] Date of Patent: Nov. 23, 1999

[54] TEMPERATURE MEASUREMENT WITH INTERLEAVED BI-LEVEL CURRENT ON A DIODE AND BI-LEVEL CURRENT SOURCE THEREFOR

[75] Inventors: James Jason LoCascio, San Jose; Charles Raymond Thurber, Jr., Sunnyvale, both of Calif.

[73] Assignee: Maxim Integrated Products, Inc., Sunnyvale, Calif.

[21] Appl. No.: 08/885,124

[22] Filed: Jun. 30, 1997

[51] Int. Cl.⁶ .............................. H03K 3/42; H03K 17/62
[52] U.S. Cl. .............................................. 327/512; 327/403
[58] Field of Search ................................... 327/403, 404, 327/405, 512, 530, 538, 539, 541, 543; 323/315, 317; 374/178

[56] References Cited

U.S. PATENT DOCUMENTS

| | | | |
|---|---|---|---|
| 4,224,537 | 9/1980 | Glazer ...................................... | 307/310 |
| 4,243,898 | 1/1981 | Seelbach ................................. | 307/310 |
| 4,549,818 | 10/1985 | Nishikubo et al. ...................... | 374/178 |
| 4,970,497 | 11/1990 | Broadwater et al. .................... | 340/598 |
| 5,419,637 | 5/1995 | Frye et al. ............................... | 374/178 |
| 5,422,832 | 6/1995 | Moyal ..................................... | 364/557 |
| 5,432,433 | 7/1995 | Ikeda ....................................... | 323/315 |
| 5,589,789 | 12/1996 | Kamiya ................................... | 327/404 |
| 5,608,348 | 3/1997 | Kearney et al. ......................... | 327/538 |
| 5,652,538 | 7/1997 | Boudry et al. .......................... | 327/403 |
| 5,663,674 | 9/1997 | Beyer et al. ............................. | 327/540 |
| 5,686,825 | 11/1997 | Suh et al. ................................ | 323/316 |
| 5,744,999 | 4/1998 | Kim et al. ............................... | 327/543 |

*Primary Examiner*—Toan Tran
*Attorney, Agent, or Firm*—Blakely, Sokoloff, Taylor & Zafman LLP

[57] ABSTRACT

Temperature measurement with interleaved bi-level current on a diode and bi-level current source therefor which provides a very accurate ratio of measurement currents through the diode without calibration and despite process and temperature variations. The bi-level current source uses a plurality N of individual current sources wherein the higher current is comprised of the sum of the N individual current sources and the lower current is comprised of one of the individual current sources, with a temperature measurement being made using N higher current/lower current measuring sequences and using a different one of the N individual current sources for each sequence. Proper selection of the value of N and proper ordering of the two currents in each of the N measuring sequences when the diode temperature is increasing or decreasing will provide an output temperature representing the temperature of the diode at the beginning of the N measurement sequences, at the end of the N measurement sequences, or half way between. Alternate methods of achieving the results of the invention are disclosed.

25 Claims, 6 Drawing Sheets

TEMPERATURE MEASUREMENT WITH INTERLEAVED BI-LEVEL CURRENT ON A DIODE AND BI-LEVEL CURRENT SOURCE THEREFOR

BACKGROUND OF THE INVENTION

1. Field of the Invention

The present invention relates to the field of bandgap temperature sensors.

2. Prior Art

Bandgap temperature sensors are well known in the prior art. Such temperature sensors are based on the variations of a pn junction forward conduction voltage drop with temperature of and current density in the pn junction. In one form, two, typically identical transistors are operated with different currents there through, and accordingly with a correspondingly different current density. An output is provided proportional to the difference in the forward conduction voltage drop of the two transistors, which output is proportional to absolute temperature. In another form, a form particularly of interest in the present invention, utilizes a single pn junction such as a diode or diode-connected transistor, operating first at one current and thus one current density, and then at a second current and thus a second current density different from the first current density. The difference in the forward conduction voltage drop under the two operating conditions is also proportional to absolute temperature.

In either event, the base-emitter voltage, or the forward conduction voltage drop across a pn junction diode, may be expressed by the equation:

$$V = V_{go}(1-T/T_0) + V_{BE0}(T/T_0) + nKT/q \, ln(T_0/T) + KT/q \, ln(I_C/I_{C0})$$

where:
- $V_{BE}$ = voltage drop across the pn junction
- $V_{go}$ = semiconductor bandgap extrapolated to a temperature of absolute zero
- $V_{BE0}$ = pn junction V at temperature $T_0$ and corresponding current $I_{C0}$
- q = electron charge
- n = structure factor When two identical pn junctions are operated with current densities J1 and J2, or alternatively as in the present invention, a single pn junction is first operated with a pn junction current of J1 and then operated with a pn junction current of J2, the difference in the pn junction forward conduction voltage drops ΔV from the above equation may be expressed as:

$$\Delta V = (KT/q) \, ln(J_1/J_2)$$

Thus, the difference in the forward conduction voltage drops is directly proportional to absolute temperature. It may also be seen from the foregoing equation, however, that the scale factor for the sensitivity of the difference in the forward conduction voltage drops with temperature is dependent on the ratio of the current densities. If the ratio is not well controlled, then the scale factor of the temperature sensitivity of the difference in the forward conduction voltage drops in microvolts per degree centigrade is also not well controlled. In the prior art, the two different but proportional currents were generated with a current mirror using transistors of substantially different size, so that one current would only be a fraction of the other current. Since the ratio of the two currents is primarily transistor size dependent, reasonable control of the current ratios could be obtained. If greater accuracy was required, circuit trimming could be done at the wafer stage to provide a more accurate current ratio. Even then, however, the two currents would not track each other that well over the required temperature range, so that even with the expense of circuit trimming, the accuracy of the temperature measurement is limited. One aspect of the present invention is the provision of currents through a pn junction temperature sensor which effectively have a precise current ratio independent of processing variations and temperature variations in the current sources.

Also in the prior art, when two successive different currents are provided through a single pn junction for temperature measurement purposes, the measurement will be in error if the temperature of the pn junction changes between the time the first current is provided there through and the time the second current is provided there through. In the present invention, this problem is overcome, allowing a temperature measurement to accurately reflect, by way of example, the temperature at the beginning of a measurement cycle, at the end of the measurement cycle, or midway through the temperature measurement.

BRIEF SUMMARY OF THE INVENTION

Temperature measurement with interleaved bi-level current on a diode and bi-level current source therefor which provides a very accurate ratio of measurement currents through the diode without calibration and despite process and temperature variations. The bi-level current source uses a plurality N of individual current sources wherein the higher current is comprised of the sum of the N individual current sources and the lower current is comprised of one of the individual current sources, with a temperature measurement being made using N higher current/lower current measuring sequences and using a different one of the N individual current sources for each sequence. Proper selection of the value of N and proper ordering of the two currents in each of the N measuring sequences when the diode temperature is increasing or decreasing will provide an output temperature representing the temperature of the diode at the beginning of the N measurement sequences, at the end of the N measurement sequences, or half way between. Alternate methods of achieving the results of the invention are disclosed.

DETAILED DESCRIPTION OF THE INVENTION

Figures 1, 2:
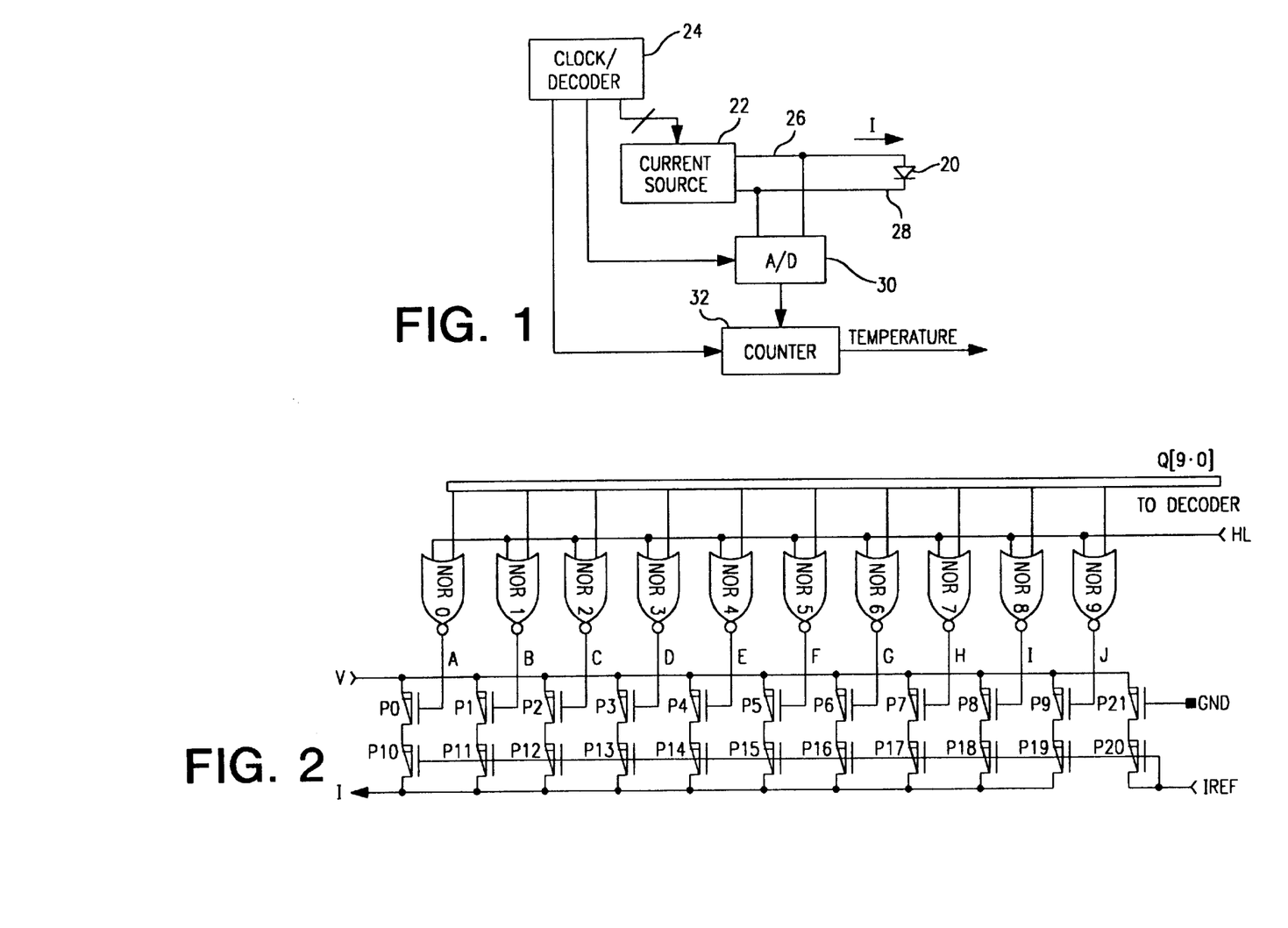
FIG. 1 is a conceptual block diagram for a system incorporating the present invention.
FIG. 2 is a circuit diagram for a preferred embodiment of the current source of the present invention.

First referring to FIG. 1, a conceptual block diagram for a system incorporating the present invention may be seen.

As shown in this Figure, a pn junction diode 20 is coupled to a current source 22, controlled by some form of clock/decoder 24. Coupled to the leads 26 and 28 to the pn junction diode 20 is an analog-to-digital converter 30, the output of which is connected to a counter 32, which provides an output indicative of the temperature of the pn junction 20. In the preferred embodiment, the analog-to-digital converter is a differential analog-to-digital converter providing zero to n output pulses for n clock pulses from clock 24, dependent upon the amplitude of the differential voltage input thereto. Also in the preferred embodiment, the counter 32 is an up/down counter, responsive to the output pulses of the analog-to-digital converter 30, counting up or down responsive to a control signal thereto from the clock/decoder 24, with the ultimate output of a temperature measurement cycle being the final count of the counter which is representative of the temperature of the pn junction diode 20.

The function of the current source in this general type of temperature measurement system is to effectively provide first and second currents, and thus first and second current densities, through the pn junction 20, so that the forward conduction voltage drop across the pn junction may be measured at each of the two different current densities. The difference in these forward conduction voltage drops is proportional to absolute temperature. For this purpose, in the preferred embodiment, the output pulses from the analog-to-digital converter 30 are counted up by counter 32 during the period the pn junction diode 20 is operated at the higher current density and counted down during the period when the pn junction diode 20 is operated at the lower current density, the net count being the difference in the forward conduction voltage drops, and thus proportional to absolute temperature. (In all examples given herein, whether a counter like counter 32 is used or voltages are measured by some other technique, the low current measurements are subtracted from the high current measurements regardless of the order of the current sequences.)

The system of FIG. 1 is conceptual only, as the system may be realized in various forms depending upon the particular requirement and/or larger system in which the temperature sensing system is used. By way of example, the clock/decoder 24 might be some form of sequencer or microcontroller, or part of a larger processor based system, depending upon the specific application. Similarly, the analog-to-digital converter 30 and/or the counter 32 might readily take other forms, as may also be convenient in any specific application. Of particular importance to the present invention, however, is the current source 22. In particular, since the difference $\Delta V$ in the forward conduction voltage drops across the pn junction 20 is equal to $(KT/q) \ln (J_1/J_2)$, the scale factor of $\Delta V$ with respect to a change in temperature will be dependent upon the ratio of the two current densities used. Thus, while the magnitudes of the two currents used may change without affecting that scale factor, the ratio of the two currents must remain constant, independent of system temperature as well as the diode temperature. Further, unless circuit trimming during manufacturing is to be undertaken, or some other provision for adjusting the scale factor is made, substantial inaccuracies will be caused by variations in the current ratio, system to system, and over the system operating temperature range.

In the present invention, the current source 22 is a unique current source, in effect providing a precise current ratio unit to unit, in spite of integrated circuit fabrication process variations and operating temperature variations of the system. A preferred embodiment of the current source 22 of the present invention is shown in FIG. 2. In this Figure, 10 NOR gates NOR0–NOR9 are provided, each having one input connected to one of ten lines from a decoder (clock/decoder 24 of FIG. 1) and a second input HL connected in common with the second input of each of the other NOR gates. The output of each NOR gate controls the gate of a respective p-channel transistor P0-P9, which p-channel transistors are each connected in series with a respective second p-channel transistor P10-P19. Thus, when the output A-J of any one NOR gate is high, the respective one of p-channel transistors P0–P9 is turned off, whereas when the output A-J of any NOR gate is low, the respective p-channel transistor P0-P9 is turned on.

The gates of p-channel transistors P10–P19 are all connected in common to the gate and drain of diode connected p-channel transistor P20. The source of p-channel transistor P20 is connected to the drain of p-channel transistor P21, with the source of transistor P21 being connected to a voltage source V and in parallel with the sources of transistors P0–P9. The gate of p-channel transistor P21 is connected to ground and the drains of p-channel transistors P10–P19 are connected in common to form the current source output I. All of the p-channel transistors P0–P21 are the same size and formed in the same integrated circuit to provide substantially "identical" transistors, though of course there typically will be small unintentional differences in characteristics of the transistors in any real integrated circuit.

In the circuit of FIG. 2, a reference current IREF is provided through the diode connected transistor P20 and through p-channel transistor P21 because of the gate thereof being connected to ground. Because of the common gate connection between p-channel transistors P1–P19 and p-channel transistor P20, transistor P20 will act as a current mirror, mirroring the current IREF to any one or more of transistors P10–P19 for those ones of p-channel transistors P10–P19 for which the respective p-channel transistor P0-P9 is on. Since transistors P0–P9 are p-channel transistors, those p-channel transistors will be on for which the respective output or outputs A–J of NOR gates NOR0–NOR9 are low. If only one of the p-channel transistors P0–P9 is on at any one time, the output current I of the current source will equal the reference current IREF to within the accuracy of the matching of the operative transistors. If, on the other hand, all of transistors P0–P9 are turned on, the output current I of the current source will equal 10 times IREF, again to an accuracy depending upon the matching of the operative transistors. In that regard, the purpose of transistor P21, which is always on because of the ground connection on its gate, is to match whatever voltage drop occurs across whichever one or ones of transistors P0–P9 is on at the time, so that the gate-source voltage of the respective one or ones of p-channel transistors P10–P19 will accurately match the gate source voltage on p-channel transistor P20, so that in turn the reference current IREF will be accurately mirrored thereto. Of course, for those p-channel transistors P0–P9 which are off at the time, no current will be mirrored to the respective ones of p-channel transistors P10–P19.

When the signal HL is high, the output of all NOR gates will be low. This will turn on all of p-channel transistors P0–P9, providing an output current I of 10 times the current IREF. When the signal HL is low, then whether a p-channel transistor P0-P9 is on will depend upon whether the second input from the decoder to the respective NOR gate is high or not. Thus, the output of the decoder may be used to turn on any one or more of transistors P0–P9, and while the decoder could be used to turn on all of transistors P0–P9, driving the signal HL high provides a more convenient way of doing so.

The concept behind the operation of the current source of the present invention may be described a follows. All transistors P0–P9 may be first turned on to provide a current I equal to the sum of all ten mirrored current components (approximately 10 times IREF) through the pn junction diode 20 (FIG. 1) and the forward conduction voltage drop across the pn junction 20 measured. Then, the signal HL may be driven low again and the output of the decoder, a one of ten decoder, used to turn on p-channel transistor P0. This provides a current I through the pn junction of diode 20 equal to the current mirrored to transistors P10–P19 (approximately IREF), during which the forward conduction voltage drop is measured again and subtracted, preferably digitally, from the value achieved with all transistors P10–P19 on. To the first order, the two currents will have a ratio of 10:1 with good accuracy because of the matching of the transistors. However, because of the less than perfect matching, a second order error may be expected in the ratio of current densities. In the present invention, a temperature measurement is taken not by one sequence of the measurement of the forward conduction voltage drop for the higher current and for the lower current, but rather ten such sequences in the embodiment being described, wherein each of the ten lower currents is taken as the current through a different respective current mirror p-channel transistors P10–P19. Thus, by way of example, all of transistors P0–P9 may be turned on to measure the higher current forward conduction voltage drop across the pn junction diode 20, then all except transistor P0 turned off to measure the lower current forward conduction voltage drop across diode 20. Then, all of transistors P0–P9 would be turned on again, to again measure the higher current forward conduction voltage drop across pn junction diode 20, and then all but transistor P1 turned off to measure the lower current forward conduction voltage drop across the pn junction 20, etc. This would be repeated successively for a total of ten times, finally turning on only transistor P9 for the final lower current forward conduction voltage drop measurement.

Since the higher current used in each individual sequence is equal to the sum of the individual lower currents used during the ten higher current/lower current sequences, the average lower current must be substantially exactly one-tenth of the higher current. (Generally, 1 divided by N times the higher current, where N is equal to the number of individual current components summed, in the preferred embodiment, 10.) Note that the exact 1 to 10 ratio of the average lower current to the higher current has been achieved with no circuit trimming and no special control on the voltage V or of the reference current IREF, other than their characteristics should remain constant during the entire measurement cycle. Thus, the current source IREF may be any well known prior art current source, preferably a reasonably temperature insensitive current source to stay within a reasonable current range over the system operating temperature range.

Figure 3:
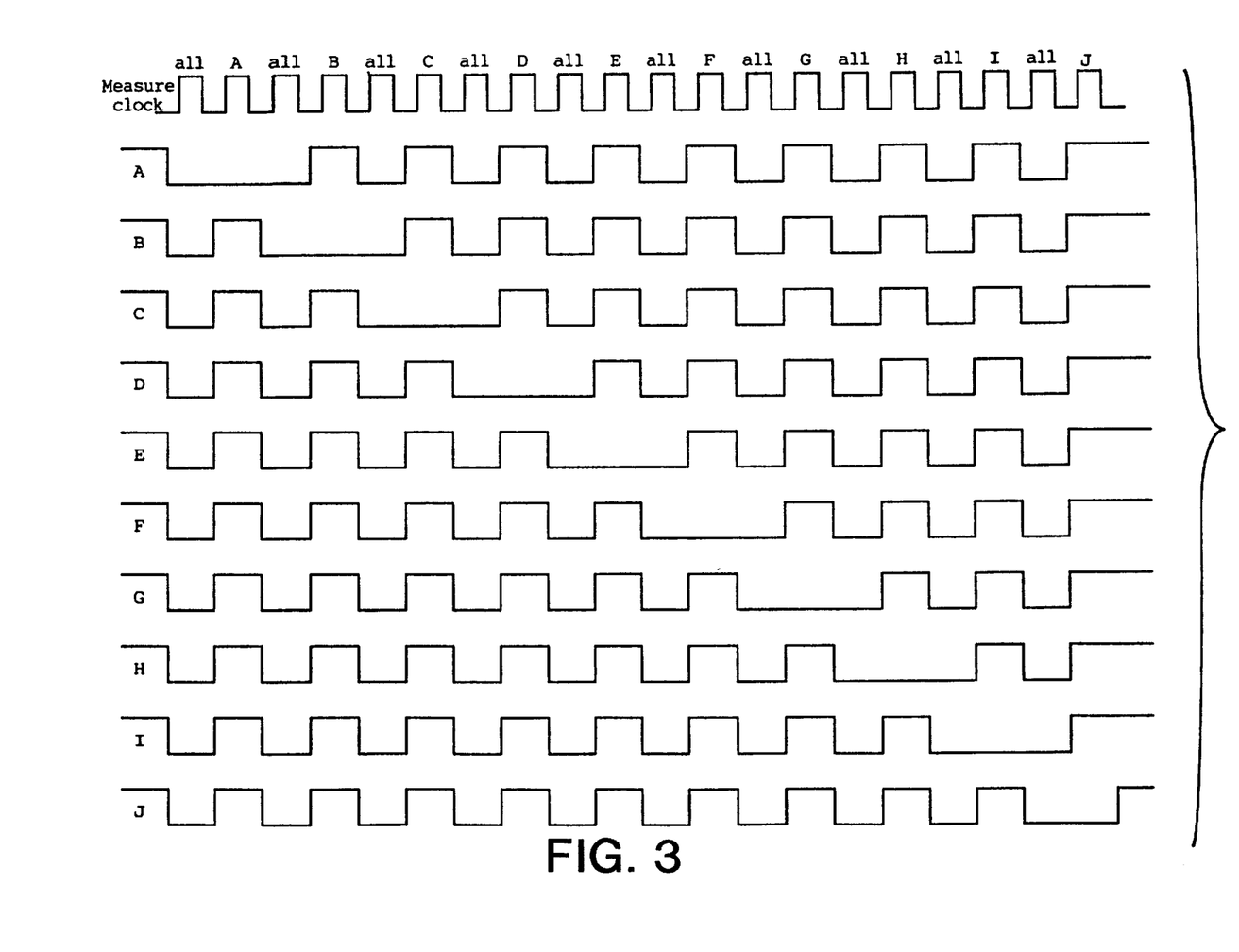
FIG. 3 is a first representative waveform diagram for the measurement clock signal and the outputs of the NOR gates of FIG. 2.

The foregoing ten higher current/lower current sequences are illustrated in FIG. 3. In this Figure, the primary measure clock signal, the signal gating each forward conduction voltage drop reading of the diode voltage, is shown at the top of the Figure, with each of the signals A–J representing the output of NOR gates NOR0–NOR9 of FIG. 2 being shown there below. In accordance with the foregoing description, on the first measure clock cycle all signals A–J are low, turning on all of transistors P0–P9 so that the current I of FIG. 2, which is the current through the pn junction diode 20 of FIG. 1, will be approximately 10 IREF. On the second measure clock cycle, signal A will remain low, though all of signals B–J will be high, so that the current through the diode 20 will be approximately IREF as mirrored through transistor P10. On the third clock cycle, signal A will again remain low, with the remaining signals B–J going low again to again turn on all transistors P0–P9 so that the output current I of the circuit of FIG. 2 will again be approximately 10 IREF, etc. It may be seen from FIG. 3 that the current through the pn junction diode sequentially alternates between approximately 10 IREF and approximately IREF as generated by successive ones of the individual current mirror transistors P10–P19.

Another aspect of the present invention is the effect of changes in the temperature of the pn junction diode 20 of FIG. 1 during the ten higher current/lower current sequences. In that regard, in many applications where thermal time constants are long and relatively high speed circuits are used, there may be insignificant temperature change at the pn junction during the full ten (or whatever other number N is used) higher current/lower current sequences. However, in some applications wherein structures are small and the heating or cooling rates are high, there may be substantial temperature changes in the pn junction during the measurement cycle, namely a rise in temperature during the overall measurement cycle or alternatively a decrease in temperature during the overall measurement cycle.

Consider the effect of a linearly changing temperature during the temperature measurement cycle. In the exemplary embodiment using the high/low current sequences of FIG. 3, the output will be proportional to:

$$(V_{1H} - V_{2L}) + (V_{3H} - V_{4L})(V_{5H} - V_{6L}) + (V_{7H} - V_{8L}) +$$
$$(V_{9H} - V_{10L}) + (V_{11H} - V_{12L}) + (V_{13H} - V_{14L}) +$$
$$(V_{15H} - V_{16L}) + (V_{17H} - V_{18L}) + (V_{19H} - V_{20L})$$

where the numerical subscripts refer to the relative time the voltage is measured However each voltage reading is taken at a temperature $\Delta T$ different from the temperature T of the previous reading. Therefore $$V_{2L} = V_{1L} + \frac{\partial V}{\partial T}\Delta T, \ V_{4L} = V_{3L} + \frac{\partial V}{\partial T}\Delta T, \ V_{6L} = V_{5L} + \frac{\partial V}{\partial T}\Delta T, \ \text{etc.,}$$

etc., where $V_{1L}$, $V_{3L}$, etc. are the voltages that would have been measured if the measurements were taken at the same time as $V_{1H}$, $V_{3H}$, etc. Therefore the above equation for the output may be rewritten as:

$$\left(V_{1H} - V_{1L} - \frac{\partial V}{\partial T}\Delta T\right) + \left(V_{3H} - V_{3L} - \frac{\partial V}{\partial T}\Delta T\right) +$$
$$\left(V_{5H} - V_{5L} - \frac{\partial V}{\partial T}\Delta T\right) + \left(V_{7H} - V_{7L} - \frac{\partial V}{\partial T}\Delta T\right) +$$
$$\left(V_{9H} - V_{9L} - \frac{\partial V}{\partial T}\Delta T\right) + \left(V_{11H} - V_{11L} - \frac{\partial V}{\partial T}\Delta T\right) +$$
$$\left(V_{13H} - V_{13L} - \frac{\partial V}{\partial T}\Delta T\right) + \left(V_{15H} - V_{15L} - \frac{\partial V}{\partial T}\Delta T\right) +$$
$$\left(V_{17H} - V_{17L} - \frac{\partial V}{\partial T}\Delta T\right) + \left(V_{19H} - V_{19L} - \frac{\partial V}{\partial T}\Delta T\right)$$

The average voltage measured may be expressed as:

$$V_{10H} - V_{10L} - \frac{\partial V}{\partial T}\Delta T = \Delta V_{10} - \frac{\partial V}{\partial T}\Delta T$$

Using a current ratio between the high current and the low current of 10, a silicon pn junction will exhibit the characteristic that the change in the pn junction voltage drop (V) with temperature is very nearly equal to 10 times the change in the difference in the two pn junction voltage drops ($\Delta V$) with temperature $$\frac{\partial V}{\partial T} \approx 10 \frac{\partial \Delta V}{\partial T}$$

Thus with a current ratio of 10, the average voltage being measured is very close to:

$$\Delta V_{10} - 10\frac{\partial \Delta V}{\partial T} = \Delta V_0$$

Consequently, the final result of the measurement, using 10 sequences, each of high current followed by low current, and using a current ratio of 10, is equal to the temperature of the pn junction at the beginning of the measurement cycle.

Figure 4:
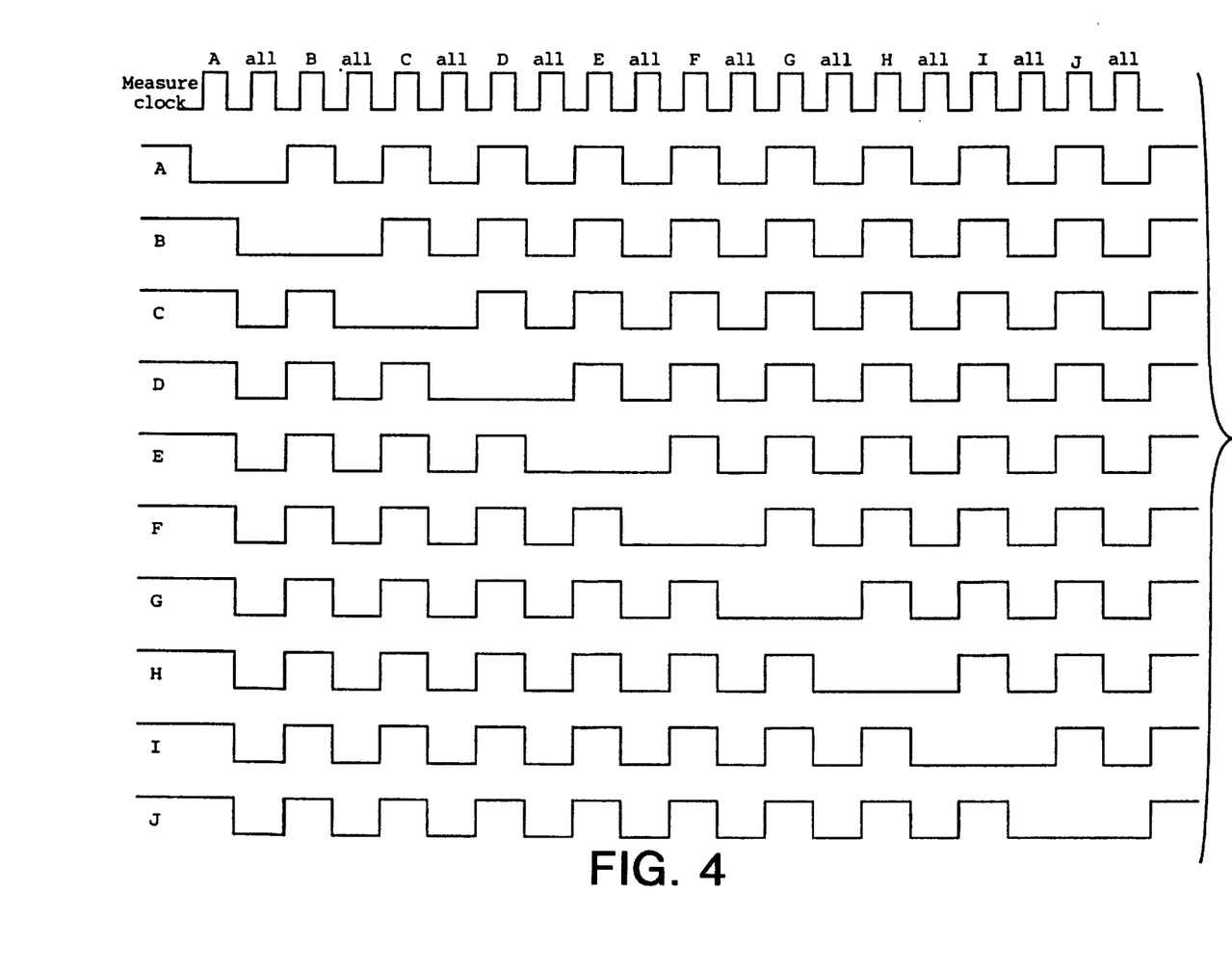
FIG. 4 is a second representative waveform diagram for the measurement clock signal and the outputs of the NOR gates of FIG. 2.

If, as shown in FIG. 4, the 10 sequences are reversed so that there are 10 sequences, each of low current followed by high current, again using a current ratio of 10, the foregoing type of analysis will show that the average voltage being measured is very close to:

$$\Delta V_{10} + 10\frac{\partial \Delta V}{\partial T} = \Delta V_{20}$$

Figure 5:
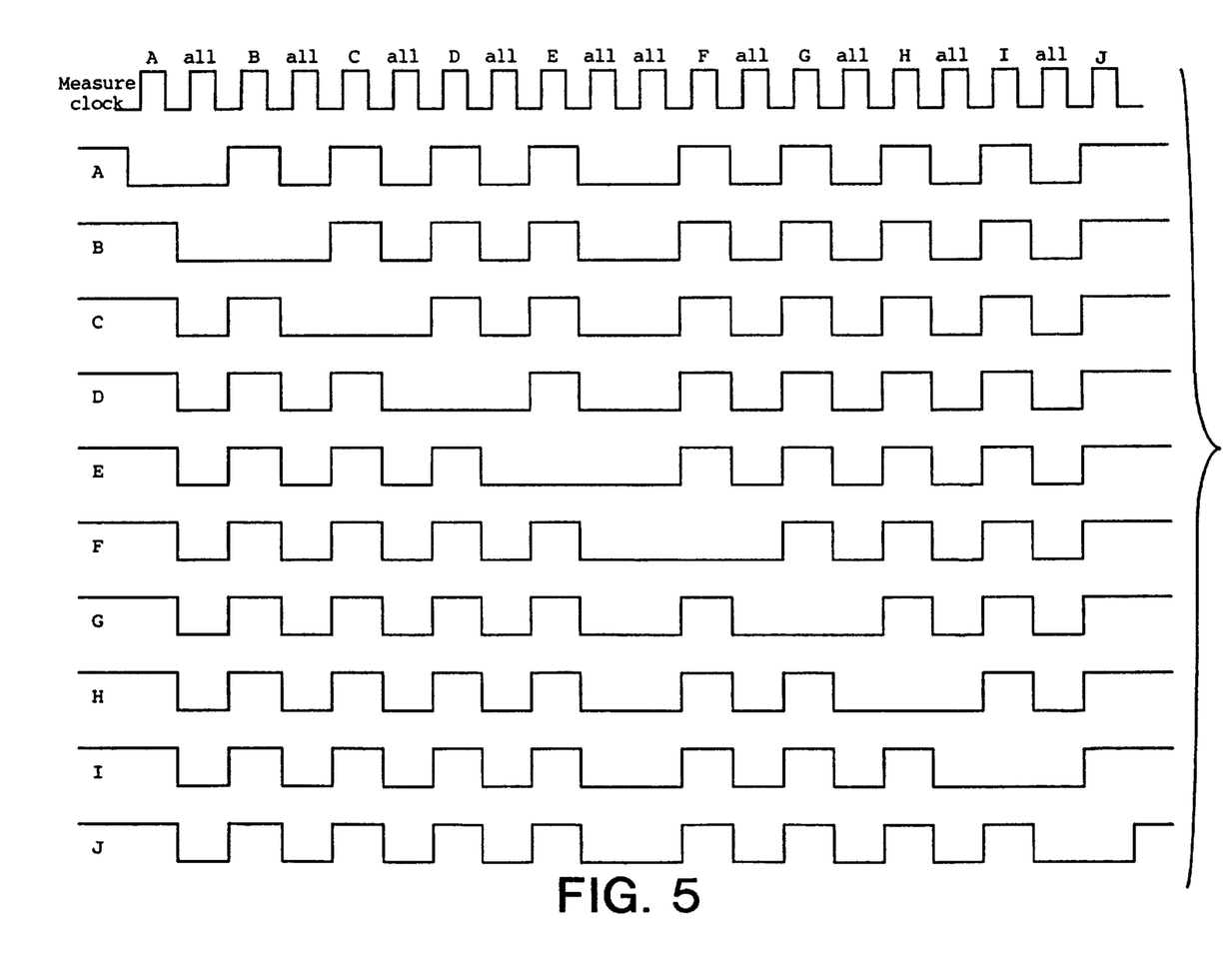
FIG. 5 is a third representative waveform diagram for the measurement clock signal and the outputs of the NOR gates of FIG. 2.
Figure 6:
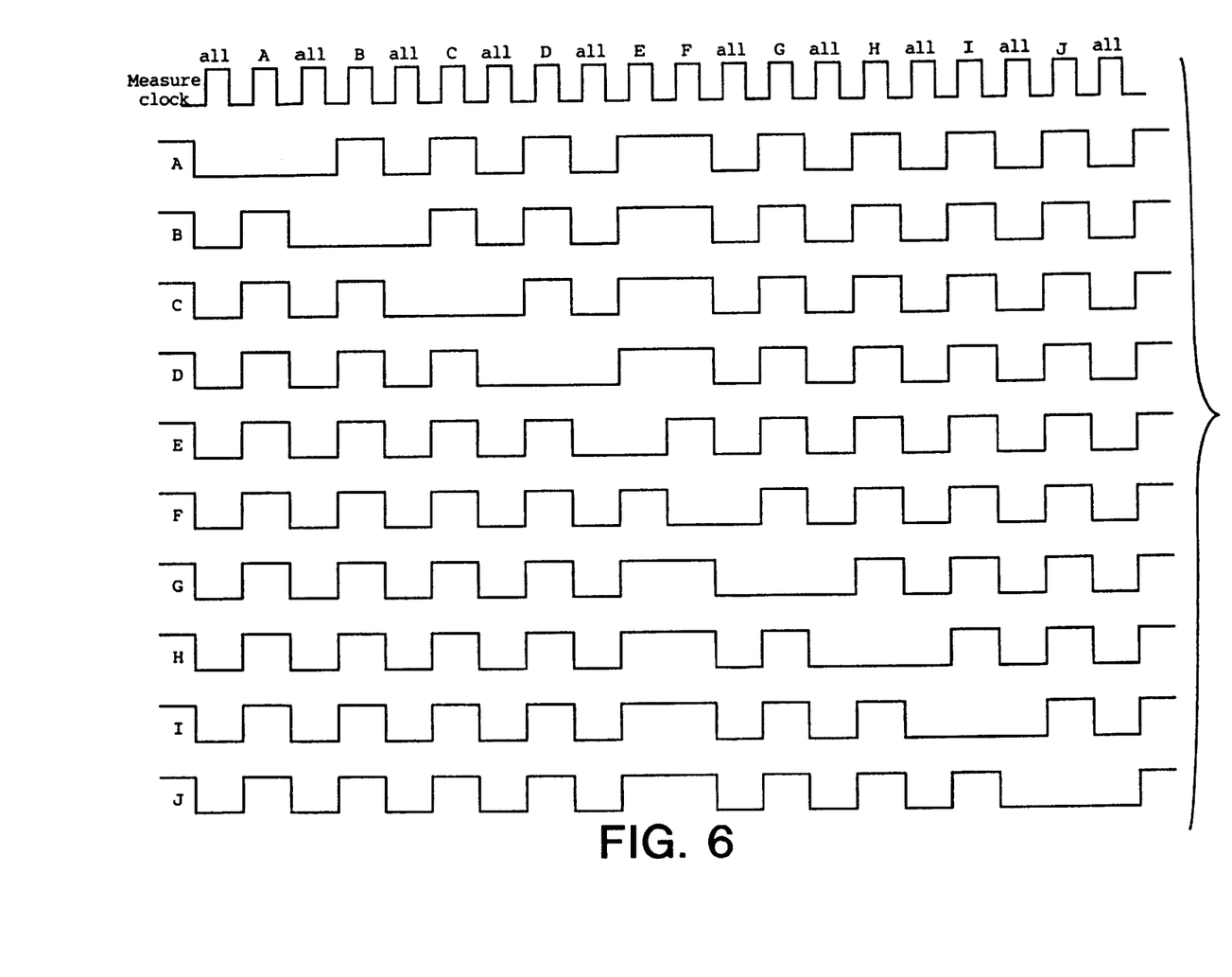
FIG. 6 is a fourth representative waveform diagram for the measurement clock signal and the outputs of the NOR gates of FIG. 2.

Now the final result of the measurement using 10 sequences, each of low current followed by high current, and using a current ratio of 10, is equal to the temperature of the pn junction at the end of the measurement cycle. If the measurement is made using 10 sequences, five sequences each of low current followed by high current, and then five sequences each of high current followed by low current, as in FIG. 5, or each five sequences of high current followed by low current and then five sequences of low current followed by high current as in FIG. 6, the average voltage being measured will be proportional to:

$$\Delta V_{10} + 0\frac{\partial V}{\partial T} = \Delta V_{10}$$

Thus the average voltage measured is proportional to the temperature of the pn junction at the midway time between the beginning and the end of the measurement cycle. Also, any intermixing of the 5 and 5 sequences will provide the same result. Similar results would be obtained for consistent high/low references in the system of FIG. 1 if the first current measurement time, high or low, was reduced to one-half the measurement time and the other half was repeated after the last full sequence.

Figure 7:
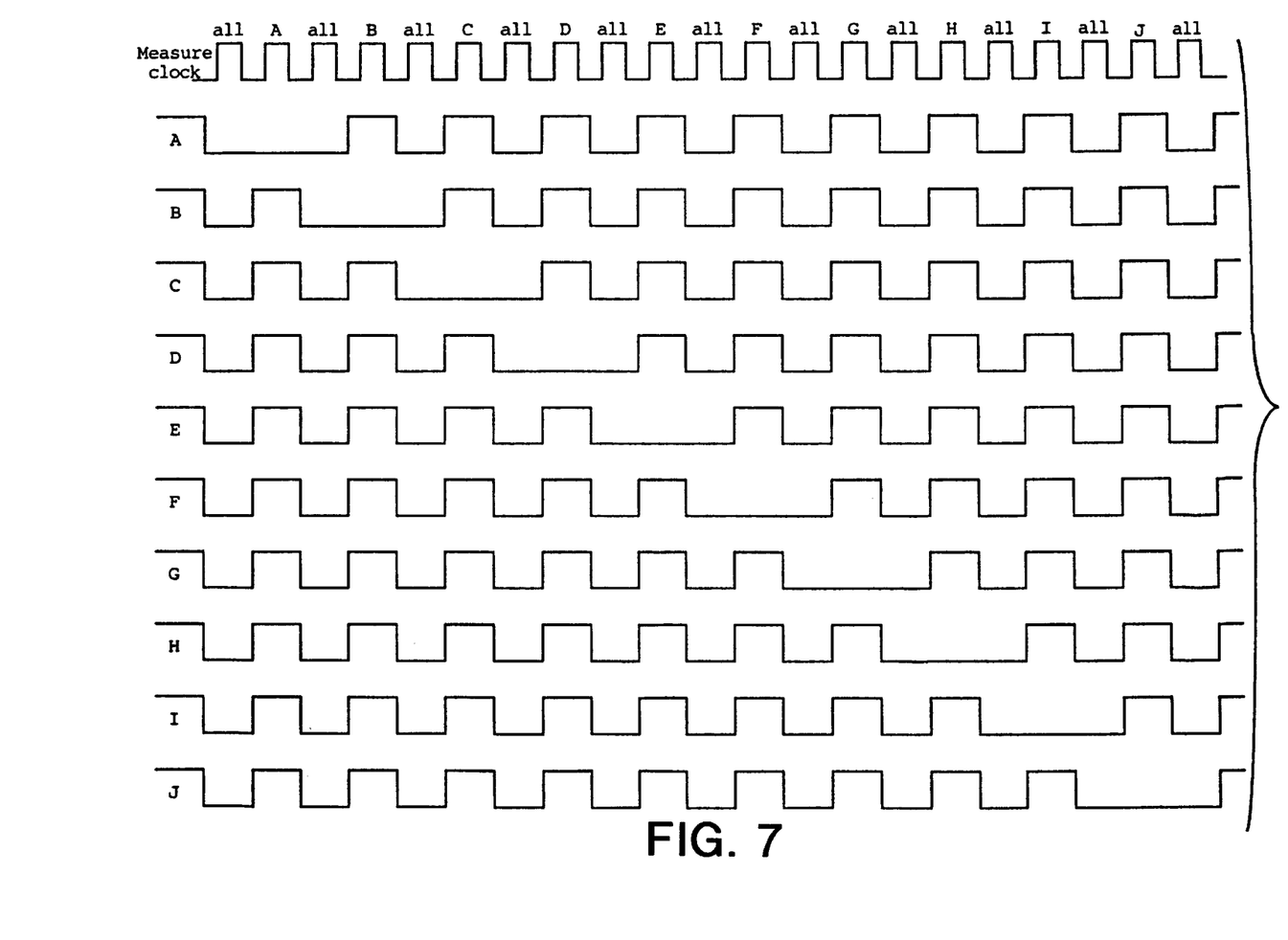
FIG. 7 is a fifth representative waveform diagram for the measurement clock signal and the outputs of the NOR gates of FIG. 2.

As a still further alternative, consider the current sequences of FIG. 7. Here there are 10 sequences of high current/low current with a final high current segment, giving a total of 21 individual current segments. Consequently, using a current ratio of 10 to 1 again, the measurement of the voltages in accordance with the present invention over the first 20 current segments measures the temperature at the beginning of the measurement cycle, and the measurement of the voltages as described over the last 20 current segments measures the temperature at the end of the measurement cycle. Consequently, knowing the counter output (FIG. 1) at the beginning of the 21 segment measurement cycle, and noting the counter output after the first high current segment, after the first twenty current segments and after the last (21st) segment allows the determination of the temperature at the beginning of the measurement cycle, the temperature at the end of the measurement cycle and the rate of change of temperature during the temperature measurement cycle. This allows the determination of the rate of change of temperature nearly twice as fast as simply using two successive measurement cycles to determine the rate of temperature change.

The same general process may be used to determine the temperature at the beginning of the measurement cycle, the temperature at the end of the measurement cycle and the rate of change of temperature during the temperature measurement cycle using a 21 segment measurement cycle starting and ending with a low current segment. If only the rate of change of temperature is desired to be measured at any time, any two high current output voltages may be measured at spaced apart times and subtracted from each other, or any two low current output voltages may be measured at spaced apart times and subtracted from each other, in either case giving a difference in junction voltage proportional to temperature and inversely proportional to the time between each measurement. While this does not take advantage of the precise current ratios provided by the present invention, it is a potential further mode of operation of the invention if and when such limited measurement may be desired.

The foregoing applies well when the number of individual current sources used for the low current and being summed for the high current is 10, and the number of two current sequences is also 10 because of the accuracy with which:

$$\frac{\partial V}{\partial T} \approx 10 \frac{\partial \Delta V}{\partial T}$$

However the use of a number of individual current sources for the low current and being summed for the high current substantially different from 10 will simply cause errors in the temperature measurement dependent on the rate of change of the temperature during the measurement cycle. Thus 10 is preferred. It is at least desirable to use a value close to 10, such as in the range of 8 to 12, to minimize errors due to the rate of temperature change during the measurement cycle without requiring a correction of some kind. Of course, changes in temperature during the measurement cycle which are not linear in rate of temperature change with time will cause different results depending on the characteristics of the temperature changes. Therefore it is preferable to keep the temperature measurement cycle reasonably short in comparison to the expected rates of temperature change to the extent reasonably possible, so that temperature changes that do occur during the measurement cycle will be small and substantially linear with time.

In a general sense, one could use M current sources, and N sequences, each sequence having one high current segment and one low current segment. The high current segments may use H of the current sources for any one high current segment, where $2 \leq H \leq M$. If H<M, then for the N high current segments, which H current sources are used should be varied so that each current source is used the same number of times for the high current over the N sequences.

The low current segments may use L of the current sources for any one current segment, where 1≦L<H, with which L current sources used being varied so that each current source is used the same number of times for the low current over the N sequences. By way of example, consider the following six sequences (N=6) using six current sources (M=6), and using H=4 and L=2, giving a high current/low current ratio of 2:

| Sequence | Current value | Current sources |
|----------|---------------|-----------------|
| 1 | H | 1,2,3,4 |
| 1 | L | 1,3 |
| 2 | H | 2,3,4,5 |
| 2 | L | 2,4 |
| 3 | H | 3,4,5,6 |
| 3 | L | 3,5 |
| 4 | H | 4,5,6,1 |
| 4 | L | 4,6 |
| 5 | H | 5,6,1,2 |
| 5 | L | 5,1 |
| 6 | H | 6,1,2,3 |
| 6 | L | 6,2 |

Here, each current source is used 4 times for the high current segments and 2 times for the low current segments. If there are N sequences using H current sources for each high current, then to take full advantage of the present invention, the total current source use for the high currents must be evenly divisible by M, or HN/M=an integer. Also with N sequences using L current sources for each low current, then to take full advantage of the present invention, the total current source use for the low currents must also be evenly divisible by M, or LN/M=an integer. In the above example, since N=M, H and L are only constrained by 2≦H≦M and 1≦L<H.

However N and M are not necessarily constrained to be equal. If 8 sequences (N=8) were used with 6 current sources (M=6), HN/M=an integer and LN/M=an integer would require that the choices for H and L be confined to 3 and 6. Since H>L, H would be 6 and L would be 3, again giving a current ratio of 2 to 1. Other choices for H and L, given 8 sequences with 6 current sources, would not allow each current source to be used the same number of times for the high current, nor to be used the same number of times for the low current. If 10 current sources are used as in the preferred embodiment, but only 8 sequences are used, then H is limited to using all 10 current sources and L is limited to using 5 current sources at a time, again for a 2 to 1 ratio.

Finally, when the number of current sources (M) used individually for the low currents and summed for the high current, and the number of two current sequences (N), are equal (M=N), then:

$$\frac{\partial V}{\partial T} \approx N \frac{\partial \Delta V}{\partial T}$$

is most accurate when N=10

However, using M≠N, there may be combinations of M, N, H and L which also accurately measure the temperature at the beginning or the end of the measurement cycle while still rallowing each current source to be used a predetermined number of times for the high current, and to be used a smaller predetermined number of times for the low current to preserve the accuracy of the current ratios of the present invention.

Any of the foregoing methods of operation may be used with the system of FIG. 1 and the circuit of FIG. 2, with the same or a different number of current sources, using the ability to control each individual current source alone or together with one or more other current sources as required to practice the method. Thus there has been described herein a system and method for temperature measurement with interleaved bi-level current on a diode and bi-level current sources therefor which provide a very accurate ratio of measurement currents through the diode despite process and temperature variations and without calibration, and which can provide a temperature measurement representing the temperature at a known time during the temperature measurement cycle in spite of temperature changes during the measurement process. While the present invention has been disclosed and described with respect to certain preferred embodiments thereof, it will be understood by those skilled in the art that various changes in form and detail may be made therein without departing from the spirit and scope of the invention.

What is claimed is:

1. A bi-level current source comprising:
   a plurality M of current sources coupled in common to a current output;
   each of the M current sources being controllably switchable on and off;
   control circuitry controlling the switching of the M current sources on and off to controllably provide the current output equal to the current of the M current sources and alternatively to controllably provide the current output equal to the current of any one of the M current sources, the control circuitry controlling the M current sources to provide the current of a different one of the M current sources when providing the current output equal to the current of any one of the M current sources.

2. The bi-level current source of claim 1 wherein the control circuitry controls the M current sources to provide the current of a different one of the M current sources when providing the current output equal to the current of any one of the M current sources, the control circuitry cycling through the M current sources in sequence to provide an average current output, when providing the current output equal to the current of any one of the M current sources, equal to 1/M times the current output when providing the current output equal to the current of all M current sources.

3. The bi-level current source of claim 2 wherein the M current sources are sources mirrored from a single current source.

4. A bi-level current source comprising:
   an even plurality of transistors, each having first and second electrodes and a control electrode for controlling conduction between the first and second electrodes;
   the first of the plurality of transistors being diode connected with its control electrode connected to its second electrode and to a current source;
   the second transistor having its second electrode coupled to the first electrode of the first transistor, its first electrode coupled to a supply voltage, and its control electrode to a voltage to turn the second transistor on;
   the remaining plurality of transistors being coupled in pairs, the first transistor of each pair having its second electrode coupled to the second electrode of the first transistor of each other pair and to a current output, its control electrode coupled to the control electrode of the first transistor of each other pair and to the control electrode of the diode connected transistor, and its first electrode coupled to the second electrode of the second transistor of its respective pair;

the first electrode of the second transistor of each pair being coupled to the supply voltage;

the control electrode of the second transistor of each pair being coupled to a control circuit controlling the turning on of any of the second transistors of each pair.

5. The bi-level current source of claim 4 wherein the control circuit includes a plurality of logic gates, each gate coupled to the control electrode of the second transistor of each respective pair, a first control input to each gate being coupled to the first control input to each other gate to provide a single on and off control for all the gates, a second control input to each gate being coupled to provide an on and off control for each individual gate.

6. The bi-level current source of claim 4 wherein the transistors are FET transistors.

7. A method of providing a bi-level current source having first and second current outputs comprising:

(a) providing a plurality M of current sources coupled to deliver current to a common current output;

(b) turning on all M current sources to provide the first current output;

(c) turning on one of the M current sources to provide the second current output;

(d) the current source turned on in step (c) being a different current source each time the second current is to be provided, so that the average second current is equal to 1/M times the first current.

8. The method of claim 7 wherein in step (a), the plurality M of current sources are sources mirrored from a single current source.

9. A method of providing a signal responsive to temperature comprising:

(a) providing a pn junction;

(b) providing a current source coupled to the pn junction to provide a pn junction current, the current source having M individual current sources, each controllable so that any one or all M individual current sources may provide the pn junction current;

(c) controlling the pn junction current to provide M sequences of current through the pn junction, each sequence having a higher current wherein all M individual current sources provide the pn junction current, and a lower current wherein one of the individual current sources provide the pn junction current, each sequence using a different individual current source to provide the lower current; and (d) providing a signal responsive to the difference in voltage across the pn junction during each presence of the higher current there through minus the voltage across the pn junction during each presence of the lower current there through.

10. The method of claim 9 wherein the M individual current sources are generated by mirroring a reference current to each individual current source.

11. The method of claim 9 wherein each sequence of current through the pn junction comprises a sequence having the higher current first and then the lower current.

12. The method of claim 9 wherein each sequence of current through the pn junction comprises a sequence having the lower current first and then the higher current.

13. The method of claim 9 wherein half of the sequences of current through the pn junction comprise sequences having the higher current first and then the lower current, and half of the sequences of current through the pn junction comprise sequences having the lower current first and then the higher current.

14. A method of providing a bi-level current source having first and second current outputs comprising:

(a) providing a plurality M of current sources coupled to deliver current to a common current output;

(b) providing a plurality N of current sequences from the plurality M of current sources, each sequence having a high current and a low current;

(c) the high current being provided by turning on H of the M current sources, where $2 \leq H \leq M$;

(d) the low current being provided by turning on L of the M current sources, where $1 \leq L < H$;

(e) the current sources turned on in step (c) being varied each time the high current is provided so that each current source is turned on the same number of times over the N high current segments of the current sequences;

(f) the current sources turned on in step (d) being varied each time the low current is provided so that each current source is turned on the same number of times over the N low current segments of the current sequences.

15. The method of claim 14 wherein in step (a), the plurality M of current sources are sources mirrored from a single current source.

16. The method of claim 14 wherein each sequence of current comprises a sequence having the higher current first and then the lower current.

17. The method of claim 14 wherein each sequence of current comprises a sequence having the lower current first and then the higher current.

18. The method of claim 14 wherein half of the sequences of current through the pn junction comprise sequences having the higher current first and then the lower current, and half of the sequences of current through the pn junction comprise sequences having the lower current first and then the higher current.

19. A method of providing a signal responsive to temperature comprising:

(a) providing a pn junction;

(b) providing a plurality M of controllable current sources coupled in common to the pn junction to provide a pn junction current there through;

(c) providing a plurality N of current sequences to the pn junction from the plurality M of current sources, each sequence having a high current and a low current;

(d) the high current being provided by turning on H of the M current sources, where $2 \leq H \leq M$;

(e) the low current being provided by turning on L of the M current sources, where $1 \leq L < H$;

(f) the current sources turned on in step (d) being varied each time the high current is provided so that each current source is turned on the same number of times over the N high current segments of the current sequences;

(g) the current sources turned on in step (e) being varied each time the low current is provided so that each current source is turned on the same number of times over the N low current segments of the current sequences;

(h) providing a signal responsive to the difference in voltage across the pn junction during each presence of the higher current there through minus the voltage across the pn junction during each presence of the lower current there through.

20. The method of claim 19 wherein the M individual current sources are generated by mirroring a reference current to each individual current source.

21. The method of claim 19 wherein each sequence of current through the pn junction comprises a sequence having the higher current first and then the lower current.

22. The method of claim 19 wherein each sequence of current through the pn junction comprises a sequence having the lower current first and then the higher current.

23. The method of claim 19 wherein half of the sequences of current through the pn junction comprise sequences having the higher current first and then the lower current, and half of the sequences of current through the pn junction comprise sequences having the lower current first and then the higher current.

24. The method of claim 19 wherein M=N.

25. The method of claim 19 wherein M≠N.

* * * * *

UNITED STATES PATENT AND TRADEMARK OFFICE
CERTIFICATE OF CORRECTION

PATENT NO. : 5,990,725
DATED : November 23, 1999
INVENTOR(S) : LoCascio et al.

Page 1 of 1

It is certified that error appears in the above-identified patent and that said Letters Patent is hereby corrected as shown below:

<u>Title page,</u>
Item [56], References Cited, U.S. PATENT DOCUMENTS, please insert
-- 4,636,092    1/1987  Hegyi...................................374/178 --.

Item [56] References Cited, FOREIGN PATENT DOCUMENTS, please insert
-- 1,000, 222    10/1996        Rodenrijs. --.

Signed and Sealed this

Twenty-ninth Day of January, 2002

Attest:

JAMES E. ROGAN
*Attesting Officer*     *Director of the United States Patent and Trademark Office*